(12) United States Patent
Xie et al.

(10) Patent No.: US 8,838,724 B2
(45) Date of Patent: Sep. 16, 2014

(54) COMPUTATION OF CACHING POLICY BASED ON CONTENT AND NETWORK CONSTRAINTS

(75) Inventors: Haiyong Xie, Union City, CA (US);
Guangyu Shi, Cupertino, CA (US);
Guoqiang Wang, Santa Clara, CA (US);
Pengwei Wang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 562 days.

(21) Appl. No.: 12/979,584

(22) Filed: Dec. 28, 2010

(65) Prior Publication Data

US 2012/0005251 A1 Jan. 5, 2012

Related U.S. Application Data

(60) Provisional application No. 61/361,262, filed on Jul. 2, 2010.

(51) Int. Cl.
*G06F 13/00* (2006.01)
*H04L 29/08* (2006.01)

(52) U.S. Cl.
CPC .......... *H04L 67/2852* (2013.01); *H04L 67/288* (2013.01)
USPC .......................................... 709/213; 711/118

(58) Field of Classification Search
CPC .................. H04L 29/08549; H04L 29/08144; H04L 29/06; H04L 29/08072; H04L 67/288; H04L 67/2852; G06F 17/30902; G06F 12/0862; G06F 12/0864; G06F 12/0897; G06F 12/0866; G06F 12/0802
USPC .......................................... 709/213; 711/118
See application file for complete search history.

(56) References Cited

U.S. PATENT DOCUMENTS

| 5,924,116 A | 7/1999 | Aggarwal et al. |
| 6,338,117 B1 | 1/2002 | Challenger et al. |

FOREIGN PATENT DOCUMENTS

| CN | 101222424 A | 7/2008 |
| CN | 101697548 A | 4/2010 |
| EP | 2159994 A1 | 3/2010 |
| WO | 2010145228 A1 | 12/2010 |

OTHER PUBLICATIONS

Foreign Communication From A Counterpart Application, European Application No. 11780171.2, Extended European Search Report dated Aug. 1, 2013, 12 pages.

(Continued)

*Primary Examiner* — Robert B Harrell
(74) *Attorney, Agent, or Firm* — Conley Rose, P.C.; Grant Rodolph; Brandt D. Howell

(57) ABSTRACT

An apparatus comprising a first content oriented network architecture (CONA) node configured to couple to at least one second CONA nodes and implement collaborative caching in accordance with criteria comprising at least one content caching objective and at least one network operational objective, wherein the content caching objectives are in accordance with the network operational objectives. Also disclosed is a network component comprising a caching policy engine configured to receive network policy information and compute a caching policy in accordance with the network policy information, an inter-cache data transfer component coupled to the caching policy engine and configured to fetch a plurality of content object portions in accordance with the caching policy, a storage engine coupled to the inter-cache data transfer component and configured to cache the content object portions, and an eviction algorithm component coupled to the storage engine and configured to determine which, if any, of the cached content object portions are to be evicted.

15 Claims, 12 Drawing Sheets

(56) References Cited

OTHER PUBLICATIONS

Koskela, T., et al., "Web Cache Optimization with Nonlinear Model Using Object Features," Helsinki University of Technology, Laboratory of Computational Engineering, XP004470531, vol. 43, No. 6, Dec. 20, 2003, pp. 805-817.

Zhang, Q., et al., "Cost-Based Cache Replacement and Server Selection for Multimedia Proxy Across Wireless Internet," IEEE Transactions on Multimedia, XP055063178, vol. 6, No. 4, Aug. 2004, pp. 587-598.

Borst, Sem, et al., "Distributed Caching Algorithms for Content Distribution Networks," IEEE Infocom, 2010, 9 pages.

Korupolu, Madhukar R., et al., "Placement Algorithms for Hierarchical Cooperative Caching," ACM/SIAM Symposium on Discrete Algorithms, 1999, pp. 586-595.

Foreign Communication From A Related Counterpart Application, PCT Application PCT/CN2011/073674, International Search report dated Aug. 11, 2011, 3 pages.

Foreign Communication From A Related Counterpart Application, PCT Application PCT/CN2011/073674, Written Opinion dated Aug. 11, 2011, 7 pages.

Foreign Communication From a Counterpart Application, Russian Application No. 2013104414/08, Russian Office Action dated May 5, 2011, 3 pages.

Foreign Communication From a Counterpart Application, Russian Application No. 2013104414/08, English Translation of Russian Office Action dated May 5, 2011, 3 pages.

COMPUTATION OF CACHING POLICY BASED ON CONTENT AND NETWORK CONSTRAINTS

CROSS-REFERENCE TO RELATED APPLICATIONS

The present application claims priority to U.S. Provisional Patent Application No. 61/361,262 filed Jul. 2, 2010 by Haiyong Xie et al. and entitled "Method and Apparatus for Network-Friendly Collaborative Caching," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some networks provide content or services to customers, such as on demand content. In such networks, content may be transported and cached as needed, for example at a plurality of nodes or cache servers in the network. In some networks, content caching is addressed by establishing a hierarchy of cache servers, where content flows from higher tier servers to lower tier servers in pre-determined ways. Content migration between different cache servers may be triggered by content requests or by meeting price metrics that can be manually assigned by a network operator. When a cache server lacks some needed content, the missing content can be obtained from pre-determined higher tier servers or from a set of neighboring servers at the same hierarchy as the cache server. Such content caching scheme can be difficult to deploy and maintain in some networks and have operational objectives that contradict or do not meet some traffic engineering (TE) objectives. The TE objectives are considered or needed in current networks, such as Internet Service Providers (ISPs), to improve network performance, for example in terms of traffic routing. The current content caching schemes can reduce network performance by preventing some traffic TE conditions or objectives from being met.

SUMMARY

In one embodiment, the disclosure includes an apparatus comprising a first content oriented network architecture (CONA) node configured to couple to at least one second CONA nodes and implement collaborative caching in accordance with criteria comprising at least one content caching objective and at least one network operational objective, wherein the content caching objectives are in accordance with the network operational objectives.

In another embodiment, the disclosure includes a network component comprising a caching policy engine configured to receive network policy information and compute a caching policy in accordance with the network policy information, an inter-cache data transfer component coupled to the caching policy engine and configured to fetch a plurality of content object portions in accordance with the caching policy, a storage engine coupled to the inter-cache data transfer component and configured to cache the content object portions, and an eviction algorithm component coupled to the storage engine and configured to determine which, if any, of the cached content object portions are to be evicted.

In a third aspect, the disclosure includes a method comprising receiving a plurality of TE costs for a plurality of links, receiving information about a plurality of content objects, computing a caching policy in accordance with the TE costs and the information about the content objects, collecting an object portion from a node in accordance with the computed caching policy, and caching the object portion.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
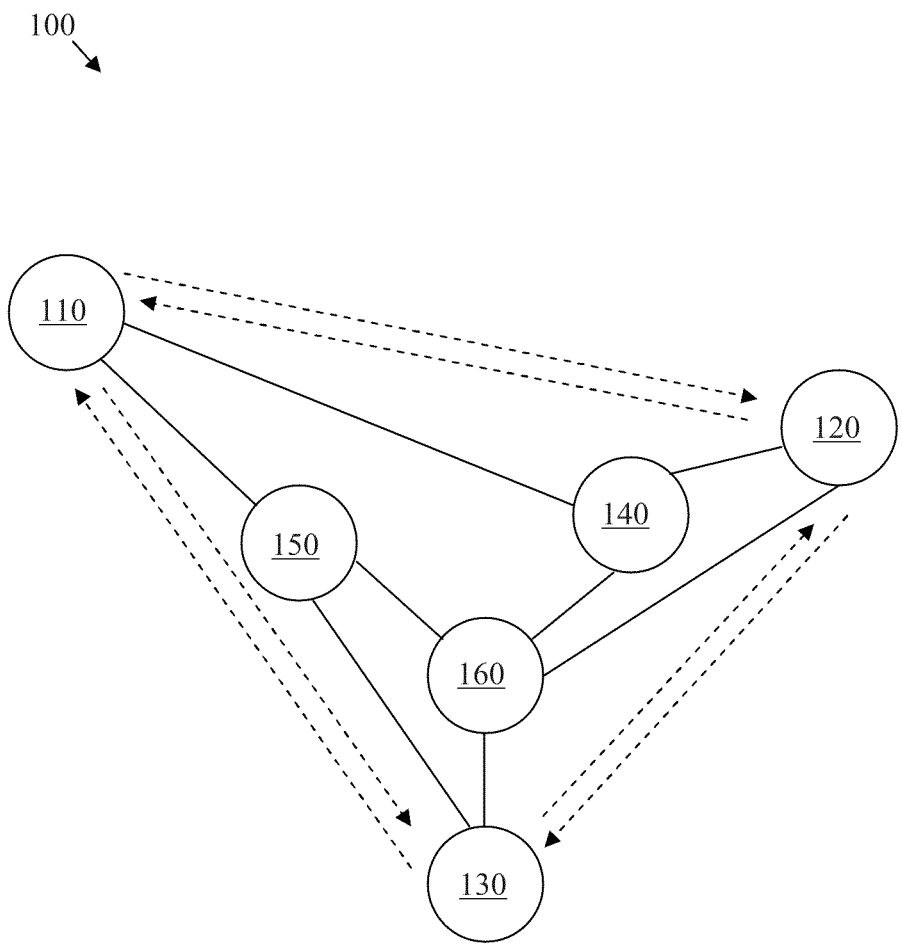
FIG. 1 is a schematic diagram of an embodiment of a network architecture.

It should be understood at the outset that although an illustrative implementation of one or more embodiments is provided below, the disclosed apparatuses, systems, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus and method for content caching that may have improved network performance, e.g. in comparison to prior content caching schemes. The content caching may be implemented using a plurality of cache servers that may be operated in a collaborative and/or distributed manner. The network performance may be improved by jointly satisfying a plurality of content caching objectives and/or a plurality of operational objectives for the network, such as those that may be established by an ISP. The operational objectives may comprise TE objectives, including balancing traffic on the links across the network, protecting potentially faulty links, achieving the metrics in service level agreements, or combinations of any one or more of the foregoing.

The apparatus and method may combine a TE scheme and a collaborative caching (CC) scheme to allocate network resources. The method may comprise deriving a TE (or virtual TE) cost from a set of optimization problems for increasing network efficiency with CC. The optimization problems may be formulated in accordance with a plurality of TE assumptions, e.g. for each considered operational objective. The TE assumptions may include a single network provider, a general network model, a logical clustering view, consistent network operational objectives that include a consistent optimization objective, or combinations of any one or more of the foregoing. The TE cost may be computed for each network link in accordance with the network operational objectives, such as TE objectives, and may be used to control a plurality of collaborative caches for content migration, content eviction, and/or content duplication.

In the assumptions to formulate the optimization problems (for TE and CC), a plurality of network optimization criteria and services may be considered for a single network provider. The network provider may comprise and own a plurality of CONA nodes. The CONA nodes may be coupled to each other in a general non-hierarchical network model. The general non-hierarchical network model may also include the case of a hierarchical network model. The network objectives may comprise load balancing and piece-wise linear link cost. The load balancing may be established in accordance with an optimization problem formulation, a distributed algorithm, and CC, as described further below. A plurality of CONA nodes may also be grouped or clustered and treated as a single logical node, for example when multiple Digital Subscriber Line Access Multiplexer (DSLAM) CONA nodes are connected via an Ethernet switch. An associated network may comprise a plurality sub-systems, e.g. a routing sub-system, a caching subsystem, and/or other sub-systems. Each sub-system may have a corresponding optimization objective. However, the overall objective of operating the entire network may be consistent, where the objectives of the different sub-systems may not conflict with each other, e.g. by design and/or enforcement.

FIG. 1 illustrates an embodiment of a network architecture 100, which may be configured in a generally "flat" structure. The network architecture 100 may comprise a plurality of nodes 110-160, which may be coupled to each other in a general non-hierarchical network model, such as in a mesh topology. Accordingly, any of the nodes 110-160 may exchange traffic directly or via other node(s) without hierarchical restrictions or relations. The network architecture 100 may correspond to any communications network that provides services for customer/subscribers, including Ethernet based networks, Internet Protocol (IP) networks, passive optical networks (PONs), digital subscriber line (DSL) networks, wireless networks, other communications networks, or combinations thereof. In an embodiment, the network architecture 100 may correspond to an enterprise network or a backbone network that typically has flat structures.

The nodes 110-160 may be configured to transport traffic or data in the network. The traffic may comprise packets (e.g. IP packet), frames (e.g. Ethernet frames), messages, signals, or combinations of any one or more of the foregoing. For instance, the nodes 110-160 may include bridges, routers, and/or switches, which receive, process, and/or transmit traffic in the network. The nodes 110-160 may transfer network traffic using a plurality of links or paths (as indicated by the solid lines in FIG. 1), which may be determined using TE and may support CC between at least some of the nodes. The nodes 110-160 may represent physical layer nodes that receive, process, and/or send traffic at the network physical layer. The nodes 110, 120, and 130 may also be configured to transfer content and/or services, which may be requested by one or more end users. For instance, the nodes 110, 120, and 130 may be CONA nodes that receive, transfer, cache, and exchange content traffic between each other (as indicated by the arrow lines in FIG. 1) in a CONA capable network. The nodes 110, 120, and 130 may represent the CONA nodes that handle traffic at the content plane and corresponding physical layer nodes that handle network traffic at the physical layers.

The content may comprise data, voice, video, multimedia, Internet, and/or any application specific content, such as gaming content. In some embodiments, the end user may be any user equipment coupled to the network, for example to any of the nodes 110-160. In a further embodiment, the network architecture may correspond to an ISP and the end user may correspond to a content provider or customer of the ISP. For example, the end user may be associated with a communication device at a customer premise or user equipment, such as an optical network terminal (ONU) or a very high bit rate DSL (VDSL) transceiver unit at a residential location (VTU-R). Alternatively, an end user may correspond to a home-based piece of communication equipment, such as a set-top box, fixed personal device (such as a desktop computer), or a mobile personal device, such as a cellular phone (including so-called "smart" phones (i.e., cellular devices capable of voice and data)), a laptop computer, or a portable computing device, such as a tablet-type of computer.

In the network architecture 100, the TE cost may be derived from a set of optimization problems, which may increase network efficiency and support CC between the CONA nodes. The optimization problems may be designed or formulated in accordance with some requirements or desired computational system properties. For example, it may be desired that the system solution be substantially distributed to improve the scalability of the solution to the network. It may also be desirable to avoid using integer programming (IP) in the formulation of the problems, if possible, which may result from the formulation of a nondeterministic polynomial (NP) time problem. Additionally, it may be desirable to obtain a solution that is relatively easily extendible or expandable to accommodate new sub-systems that may be added to the network. For instance, a new Storage Cloud (SC) sub-system may be added to a combined TE sub-system and CC sub-system without the need to substantially redesign the resulting combined TE, CC, and SC system.

The TE objectives may be considered jointly for a plurality of traffic classes in the network, e.g. without differentiating between different traffic classes. The traffic classes may comprise the inter-cached data transfers, e.g. between the nodes 110, 120, and 130, which may be treated similar to other network traffic. The joint TE and CC (TECC) problem may be formulated as follows:

$$\min \max_{e \in E} \left( b_e + \sum_{i \neq j} t_{ij} l_e(i,j) \right) / c_e \quad (1)$$

$$s.t. \ \forall \ i, j \in I, \ t_{ij} = \sum_{k \in K} y_i^k (1 - y_j^k) s_k q_j^k \quad (2)$$

-continued $$\forall k \in K, \sum_{i \in I} y_i^k \geq 1 \tag{3}$$

$$\forall i \in I, \sum_{k \in K} y_i^k s_k \leq v_i \tag{4}$$

$$\sum_{k \in K} s_k \leq \sum_{i \in I} v_i \tag{5}$$

$$y_i^k \in \{0, 1\} \tag{6}$$

The six constraints above (labeled (1)-(6)) represent a plurality of constraints to formulate the TECC problem. The first constraint (e.g. constraint (1)) may satisfy the TE objective (e.g. load balancing). In constraint (1), $t_{ij}$ is the inter-cache traffic (due to data transfer from node i to node j), $I_e(i,j)$ is a routing matrix (which may be equal to about one if link e is on the directed path from i to j), $c_e$ is the physical capacity (e.g. bandwidth) of link e, and $b_e$ is the background traffic incurred by other applications on link e. Constraint (1) is a TE objective for balancing link load but other objectives may also be used, such as one or more piece-wise linear link cost functions to capture the overall network cost.

Constraint (2) may ensure inter-cache data transfer, e.g. satisfy the CC objective. In constraint (2), node j may receive a request data object k with probability $q_j^k$. If j does not have a local copy (e.g. $y_j^k=0$, thus $1-y_j^k=1$), then j needs to fetch the object from another node i that has the content (e.g. $y_i^k=1$). For any object k, when $y_j^k=1$ (e.g. node j has a local copy) or $y_i^k=0$ (e.g. node i does not have a local copy), then inter-cache data transfer from i to j may not occur (e.g. $y_i^k(1-y_j^k)=0$). Constraint (3) may ensure that a replica may exist in some node. In constraint (3), any object k may be replicated by one or more nodes. Constraint (4) may meet a cache storage limit. In constraint (4), the total storage space used by replicas may not exceed the available physical storage (e.g. physical disk space) of node i.

Constraint (5) may ensure that the cache storage is sufficiently large, such that the complete data object may be replicated by the available caches, e.g. when aggregated. The cache storage available at the network nodes that are being considered may not be sufficiently large. As such, one or more virtual CONA nodes may be introduced in accordance with demand (so-called "dynamic caching"), such as one or more content originating servers. The servers may store only relevant objects and serve requests for such stored objects. Constraint (6) may present a binary variable to represent whether objects are stored in caches. In constraint (6), $y_i^k=1$ if object k is stored locally at node i, and $y_i^k=0$ otherwise. The TECC problem above may be implemented using a quadratic program.

In another embodiment, a simplified TECC problem may be formulated, e.g. by removing the quadratic terms in the TECC problem formulation above. An indicator variable $x_{ij}^k$ may be introduced to represent the inter-cache data transfer (e.g. $x_{ij}^k=1$ if node i transfers object k to node j). Using the indicator variable may simplify the TECC problem, which may then be implemented using an integer program instead of a quadratic program. However, the TECC formulation in accordance with the integer program may still be difficult to solve.

In another embodiment of the TECC problem, each CONA node may implement at least partial caching, where a portion of a content object may be locally cached at one or more CONA nodes. This form of "distributed caching" of at least partial content at one or more local CONA nodes significantly improves network performance, particularly in video and multimedia applications. The TECC problem for partial caching may be formulated as follows:

$$\min_{e \in E} \max \left( b_e + \sum_{i \neq j} t_{ij} I_e(i, j) \right) / c_e \tag{7}$$

$$s.t. \ \forall i, j \in I, t_{ij} = \sum_{k \in K} x_{ij}^k s_k q_j^k \tag{8}$$

$$\forall k \in K, j \in I, \sum_{i \in I, i \neq j} x_{ij}^k + y_j^k = 1 \tag{9}$$

$$\forall i \in I, \sum_{k \in K} y_i^k s_k \leq v_i \tag{10}$$

$$\sum_{k \in K} s_k \leq \sum_{i \in I} v_i \tag{11}$$

$$\forall i, j \in I \cdot x_{ij}^k < y_i^k \tag{12}$$

$$\forall i, j \in I \cdot x_{ij}^k, y_i^k \in \{0, 1\} \tag{13}$$

Constraint (12) may indicate that when node j has a local copy of object k, then j may not fetch the same object from other nodes. The TECC problem formulation for partial caching may be implemented using an integer program. The partial caching implementation may be used for caching video content objects. For example, each video may be about 1.5 to about two hours long and have a size ranging from about 200 megabytes (MB) to about four gigabytes (GB), e.g. using H.264 codec or similar video encoding and a compression ratio of about two. A user may watch a first video for some time and then fast-forward to a later part in the video, or switch to a second video before watching the entire first video. In such scenarios, the CONA collaborative caching may be inefficient if each CONA node is configured to cache the entire video object. Partial caching may allow each CONA node to store a part of an object instead of the entire object, which may be advantageous in the case of substantially large video objects.

In an embodiment, the TECC problem may be formulated in accordance with an indicator variable $x_{ij}^k$ that represents the partially cached portion of object k, which is transferred from i to j. The TECC problem may be formulated as follows:

$$\min_{e \in E} \max \left( b_e + \sum_{i \neq j} t_{ij} I_e(i, j) \right) / c_e \tag{14}$$

$$s.t. \ \forall i, j \in I \text{ and } i \neq j, t_{ij} = \sum_{k \in K} x_{ij}^k s_k q_j^k \tag{15}$$

$$\forall k \in K, i \in I, \sum_{j \in I, j \neq i} x_{ji}^k + x_{ii}^k \geq 1 \tag{16}$$

$$\forall i \in I, \sum_{k \in K} x_{ii}^k s_k \leq v_i \tag{17}$$

$$\sum_{k \in K} s_k \leq \sum_{i \in I} v_i \tag{18}$$

$$\forall i, j \in I \text{ and } i \neq j, k \in K, x_{ij}^k \leq x_{ii}^k \tag{19}$$

$$\forall i \in I, k \in K, x_{ii}^k s_k \geq \overline{s_k} \tag{20}$$

$$\forall i, j \in I, k \in K, 0 \leq x_{ij}^k \leq 1 \tag{21}$$

Constraint (16) may ensure that (a) any object is cached in the network, and (b) any node i can obtain a substantially complete copy of each object from one or more other nodes.

Constraint (19) may indicate that the portion of object k that node i can upload from j is at most the portion that i has locally cached (e.g. node i cannot provide more content than it has). Constraint (20) may indicate that each content object may be divided into portions for storage and caching purposes, and that the portion size is at least equal to $\bar{s}_k$. When there is a remainder of the content object (e.g. $s_k \bmod \bar{s}_k \neq 0$), the remainder may be fetched from the origin (e.g. a content server) and may not be cached anywhere in CONA nodes. The TECC problem formulation above may be implemented using a linear program, which may be easier to solve than a quadratic or integer program. However, implementing constraint (12), e.g. $\{x_{ij}^k | \forall i,j \in I, k \in K\}$, in the formulation or algorithm may be challenging, since $x_{ij}^k$ does not indicate how different are the cached object portions stored at two nodes.

Since the differences between the object portions cached by two nodes may not be known, a simpler problem formulation may be used. As such, the TECC problem may be formulated in accordance with an indicator variable $x_i^k$ that represents the partially cached portion of object k at node i, as follows:

$$\min_{e \in E} \max \left( b_e + \sum_{i \neq j} t_{ij} I_e(i,j) \right) / c_e \quad (22)$$

$$s.t. \ \forall i, j \in I \text{ and } i \neq j, t_{ij} = \sum_{k \in K} x_i^k s_k q_j^k \quad (23)$$

$$\forall k \in K, \sum_{i \in I} x_i^k \geq 1 \quad (24)$$

$$\forall i \in I, \sum_{k \in K} x_i^k s_k \leq v_i \quad (25)$$

$$\sum_{k \in K} s_k \leq \sum_{i \in I} v_i \quad (26)$$

$$\forall i \in I, k \in K, x_i^k s_k \geq \bar{s}_k \quad (27)$$

$$\forall i, j \in I, k \in K, 0 \leq x_i^k \leq 1 \quad (28)$$

In the formulation above, a percentage for each object that each CONA node may cache locally is defined, but the decision of which portion each node may cache for each object may not be specified. Accordingly, a percentage of any considered object each CONA node may cache locally is computed. Computing the percentage of objects that may be cached by each CONA node may not be suitable for all considered objects since some objects may be relatively large and other objects may be relatively small. Additionally, some objects may be considered more important than other objects. In such scenarios, objects may be classified into one or more appropriate classes, e.g. in accordance with their importance levels, priorities (user or operator-defined, or otherwise), sizes, and/or other classifications. Thus, the problem may be reformulated by introducing the concept of "object class." The TECC problem formulation above may be implemented using a linear program.

In another embodiment, the TECC problem may be formulated in accordance with a first indicator variable $x_{ij}^k$ that represents a portion of an object k that is sent from node i to node j, and a second indicator variable $y_i^k$ that represents a portion of an object k that is cached by node i. The TECC problem may be formulated as follows:

$$\min_{e \in E} \max \left( b_e + \sum_{i \neq j} t_{ij} I_e(i,j) \right) / c_e \quad (29)$$

$$s.t. \ \forall i, j \in I \text{ and } i \neq j, t_{ij} = \sum_{k \in K} x_i^k s_k q_j^k \quad (30)$$

$$\forall k \in K, i \in I \sum_{j \in I} x_{ji}^k + y_i^k \geq 1 \quad (31)$$

$$\forall i \in I, \sum_{k \in K} y_i^k s_k \leq v_i \quad (32)$$

$$\forall i, j \in I, k \in K, 0 \leq x_i^k \leq y_i^k \leq 1 \quad (33)$$

The TECC problem formulation above may be implemented using a linear program. Table 1 below displays some of the terminology and notations used in the TECC problem formulations described above.

TABLE 1

| Notation | Meaning |
|---|---|
| E | the set of all network links, individual links are indexed by e |
| K | the set of all content objects, individual objects are indexed by k individual objects are referred to as "content objects" or "data objects" interchangeably. |
| I | the set of CONA nodes, individual nodes are indexed by i each node may be a logical cluster of physical CONA nodes |
| $I_e(i,j)$ | link-path indicator variable, =1 means link e is on the directed path from i to j |
| $c_e$ | capacity of link e |
| $b_e$ | background traffic on e |
| $s_k$ | size of object k |
| $v_i$ | volume (storage capacity) of CONA node i |
| $y_i^k$ | binary variable, $y_i^k$ = 1 if node i has object k in its local cache. 0 otherwise |
| $q_i^k$ | popularity of object k locally seen by node i (local view). $\Sigma_{k \in K} q_i^k = 1$ |

The TECC problems above may be formulated and solved to allocate network resources and increase network efficiency. For instance, Table 2 shows the solution that may be obtained by solving the TECC problem formulation for the network 100 in accordance with constraints (14)-(21):

TABLE 2

| $x_{ij}$ | j = 1 | 2 | 3 |
|---|---|---|---|
| i = 1 | .6 | .3 | .2 |
| 2 | .1 | .4 | .3 |
| 3 | .5 | .5 | .8 |

In the solution above, two observations may be made. First, the diagonal element in each row of Table 2 may dominate, e.g. may be greater than, the remaining elements in the row, since the portion of object each node may provide to other nodes may not be greater than the portion the node may cache locally (e.g. $x_{ii} \geq x_{ij}, \forall i,j,j \neq i$). Second, the sum of elements in each column may not be less than about one, since each CONA node may be able to obtain a complete copy of an object ($\Sigma_{j \in I} x_{ij} \geq 1$). In accordance with this solution, the CC sub-system may be able to compute a plan for dividing each object and to store portions of the object at each CONA node.

Table 3 shows the solution that may be obtained by solving the TECC problem formulation for the network 100 in accordance with constraints (22)-(28):

TABLE 3

| i | 1 | 2 | 3 |
|---|---|---|---|
| $x_i^1$ | .6 | .2 | .3 |
| $x_i^2$ | .2 | .3 | .7 |
| ... | | ... | |
| $x_i^n$ | .1 | .6 | .7 |

According to the solution above, the three CONA nodes 110, 120, and 130 may cache about 60 percent, 20 percent, and 30 percent, respectively, of an object in class 1. The sum of the elements in the row of Table 3 may be greater than about one (e.g. $\Sigma_i x_i \geq 1$).

In an embodiment, a distributed algorithm may be derived from the decomposition of the optimization problems above. For instance, the TECC problem formulation in accordance with constraints (22)-(28) may be decomposed into a network TE sub-problem and a network CC sub-problem. When solving the TE sub-problem, network TE cost $p_e$ for a plurality of links may be computed. The TE cost $p_e$ may be the cost of routing current traffic on link e. The calculated TE costs may be aggregated along a route in the network, e.g. a series of links. The CC sub-problem may be solved by local cache engines (e.g. CONA nodes) by collecting the computed TE costs and computing an optimal $x_i^k$ for each object that indicates what portion of the object each cache may store locally. The indicator variable $x_i^k$ may be computed in accordance with the TE costs.

Figure 2:
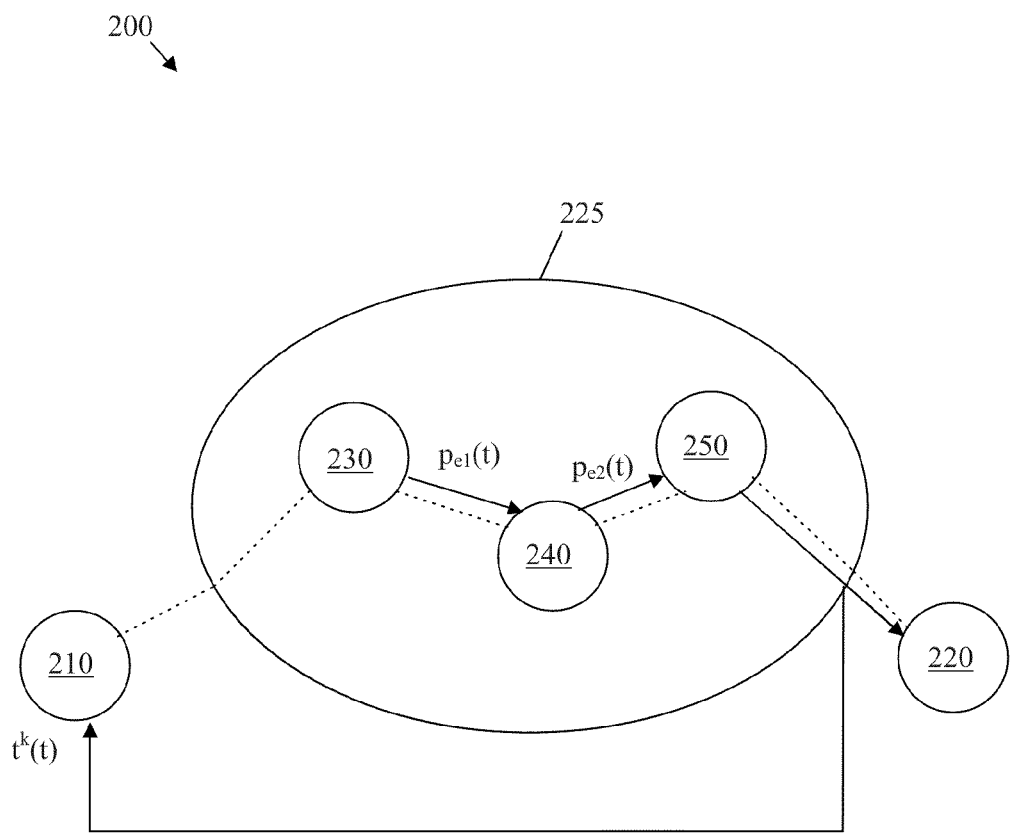
FIG. 2 is a schematic diagram of an embodiment of a distributed TE and collaborative caching scheme.

FIG. 2 illustrates an embodiment of a distributed TE and CC scheme 200. The distributed TE and CC scheme 200 may be implemented in a CONA capable network, such as in the network architecture 100 depicted in FIG. 1. The distributed TE and CC scheme 200 may solve the TECC problem by solving the TE sub-problem and then the network CC sub-problem. The network may comprise CONA nodes 210 and 220 and other nodes 225 (e.g. non-CONA nodes) that include nodes 230, 240, and 250. The nodes 210-25 may be configured substantially similar to the corresponding nodes in the network architecture 100. The nodes 210-250 may handle network traffic at the physical layer (and/or any other Open Systems Interconnection (OSI) model layer) and the nodes 210 and 220 may also be CONA nodes that comprise local cache engines that support CC.

The nodes 210-250 may be arranged as shown in FIG. 2, where the nodes 225 may be positioned in the path between the CONA nodes 210 and 220. As such, the nodes 230, 240, and 250 may be transit nodes that transfer traffic, including content objects, between the nodes 210 and 220. By solving the TE sub-problem, each link cost, e.g. $p_{e1}(t)$ between nodes 230 and 240 and $p_{e2}(t)$ between nodes 240 and 250, may be calculated, for instance in accordance with the amount or volume of traffic in the links. The links are indicated by the dashed lines in FIG. 2. The calculated link costs may then be propagated to the CONA nodes 210 and/or 220 (as indicated by the solid line arrows in FIG. 2). The total link cost $t_k(t)$ for the aggregated links may be calculated by the TE engine, which may correspond to one or more nodes or servers in the network, and propagated to the CONA nodes 210 and/or 220 or may be calculated by the nodes 210 and/or 220 in accordance with the propagated link costs, e.g. $p_{e1}(t)$ and $p_{e2}(t)$. The nodes 210 and/or 220 may then use the link costs to solve the CC sub-problem and thus calculate the local caching policies, e.g. the local object replica or portions placement policies and may determine how the policies are implemented.

Figure 3:
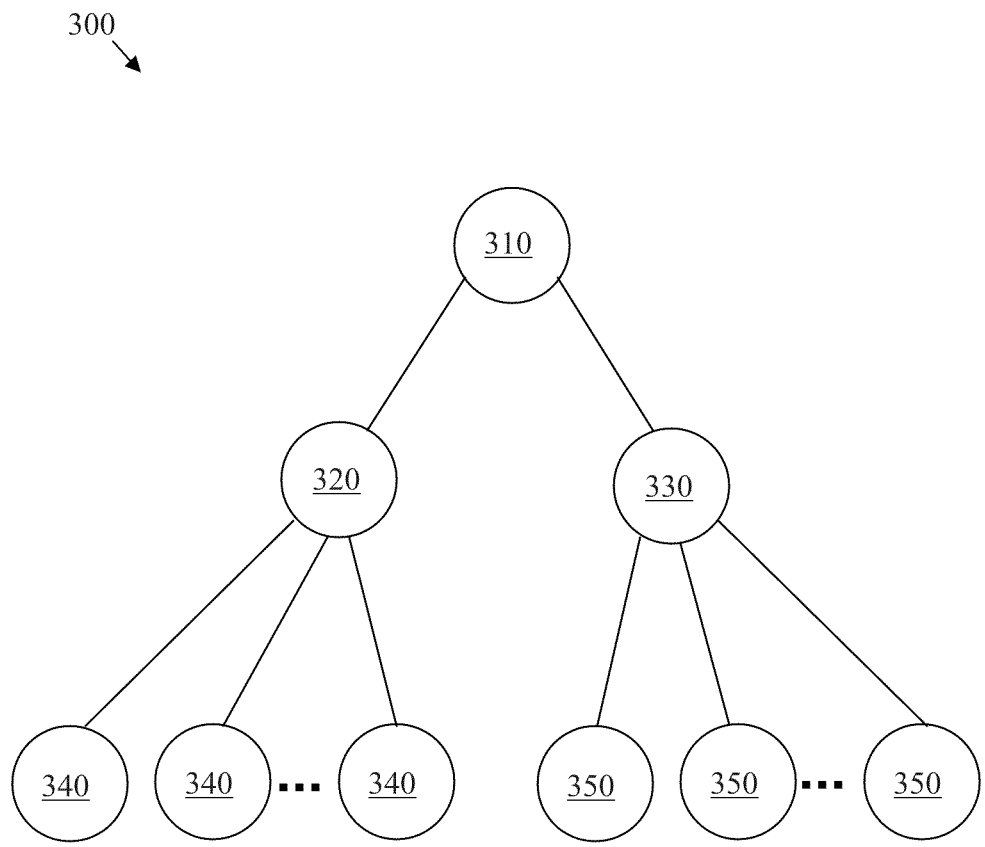
FIG. 3 is a schematic diagram of another embodiment of a network architecture.

FIG. 3 illustrates an embodiment of another network architecture 300, which may have a hierarchical structure. The network architecture 300 may comprise a plurality of nodes 310-350, which may be coupled to each other in a hierarchical network model, such as in a tree topology. Accordingly, the nodes may be classified or organized in different hierarchies or levels, where the number of nodes at lower hierarchies may be greater than the number of nodes at higher hierarchies. Thus, the average bandwidth per node at lower hierarchies may be smaller in comparison to higher hierarchies. Additionally, the nodes at the same level may not communicate with each other but may communicate with other nodes at the higher or lower hierarchies. For example, the node 310 may be located at a first level and may communicate with the nodes 320 and 330 at a lower second level, which may not communicate with each other directly. The node 320 may communicate with the nodes 340 at a lower third level, which may not communicate with each other directly. Similarly, the node 330 may communicate with the nodes 350 at the third level, which also may not communicate with each other directly.

The network architecture 300 may be a special case of the network architecture 100 and the nodes 310-350 may be configured substantially similar to the corresponding nodes 110-150. For instance, the nodes 310, 320, and 330 may be CONA nodes and the nodes 340 and 350 may be non-CONA nodes. Thus, the nodes 310, 320, and 330 may cache content objects in accordance with any of the TECC problems above. In an embodiment, the network architecture 300 may correspond to an access network, where DSLAM, broadband remote access server (BRAS), and/or backbone routers may form a multiple-level (e.g. three-level) hierarchical structure. For example, the node 310 may comprise a backbone router, each of the nodes 320 and 330 may comprise a BRAS, and the nodes 340 and 350 may comprise a plurality of DSLAMs.

To solve the TECC problem in the network architecture 300, different link costs (e.g. TE costs) may be assigned to the links at the different hierarchies, e.g. in a manual manner by the operator. For instance, if typical DSLAMs in a relatively small geographic region (e.g., a neighborhood, zip code, city, or other area, such as about 5, about 10, about 20, or about 50 square kilometer area) are connected via Ethernet switches, the costs of the links that connect the DSLAMs may be substantially lower than the cost of links that connect other BRAS nodes. The costs may be pre-computed, manually adjusted a priori or on the fly (e.g. in real time), or computed by an algorithm on demand.

Figure 4:
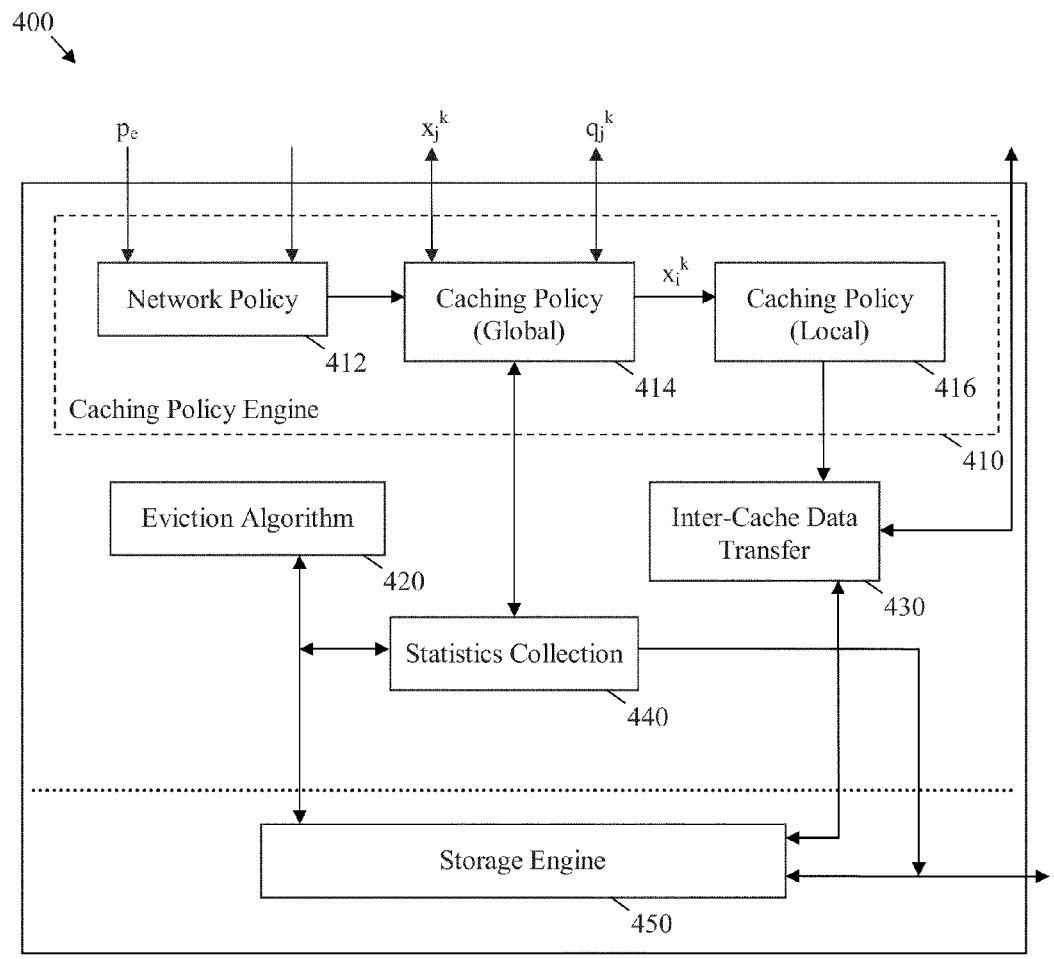
FIG. 4 is a schematic diagram of an embodiment of a caching engine.

FIG. 4 is a schematic diagram of an embodiment of a caching engine 400. The caching engine may be located at a CONA node and may be configured for CC management. As such, the caching engine 400 may implement a distributed CC algorithm (e.g. to solve the CC sub-problem), generate CC policies, update cache content according to the CC policies, or combination thereof. The caching engine 400 may comprise a caching policy engine 410, and eviction algorithm component 420, and inter-cache data transfer component 430, a statistics collection component 440, and a storage engine 450. The components of the caching engine 400 may be arranged as shown in FIG. 4 and may be implemented using hardware, software, or both.

The caching policy engine 410 may comprise a network policy component 412, a global caching policy component 414, and a local caching policy component 416. The network policy component 412 may be configured to collect network policy information, such as TE feedback information in accordance with TE link costs, e.g. $p_e$. When other operational objectives are considered, the link costs may be defined in the context of such objectives. The global caching policy component 414 may be configured to exchange a set of parameters regarding transferred object portions, e.g. $x_j^k$, and corresponding probabilities, e.g. $q_j^k$, with other global caching engines or component (at other CONA nodes). The global caching policy component 414 may implement a distributed algorithm to compute a caching policy. The caching policy may comprise an optimal replica placement strategy, e.g. $x_i^k$, which may be an input to the local caching policy component 416. The local caching policy component 416 may be configured to determine which portion for each object to cache locally in accordance with the caching policy computed by the global caching policy component 414. Accordingly, the local caching policy component 416 may instruct the inter-cache data transfer component 430 as to which object portions to fetch from other nodes.

The inter-cache data transfer component 430 may be configured to receive the object portions and send the object portions to the storage engine 450 for caching. The eviction algorithm component 420 may be configured to determine which objects or portions are to be evicted, e.g. removed and forwarded to other nodes, and instruct the storage engine 450 to do so. The statistics collection component 440 may be configured to collect different statistics information from the caching policy component 414, the eviction algorithm component 420, and the storage engine 450 and forward that information to the network or other nodes. The storage engine 450 may comprise a storage medium (e.g. hard drive) and may be configured to store or cache the received objects or portions and evict the indicated stored objects or portions. The storage engine 450 may be a passive component, such as a cache or memory. Alternatively, the storage engine 450 may be an active component that implements a processing or other active function.

In an embodiment, a plurality of CONA nodes may comprise a plurality of caching engines similar to the caching engine 400, and may solve collectively the CC sub-problem, e.g. in a distributed manner. The nodes may also support content migration between each other to distribute content or object portions and provide partial caching. Content migration may be achieved by solving the CC sub-problem using the corresponding caching policy engines 410, fetching the object portions using the inter-cache data transfer components 430, and evicting some cached objects or portions using the eviction algorithm components 420. Content migration between the nodes may satisfy the content caching objectives, e.g. caching policies, and the operational objectives, e.g. TE objectives or policies.

Figure 5:
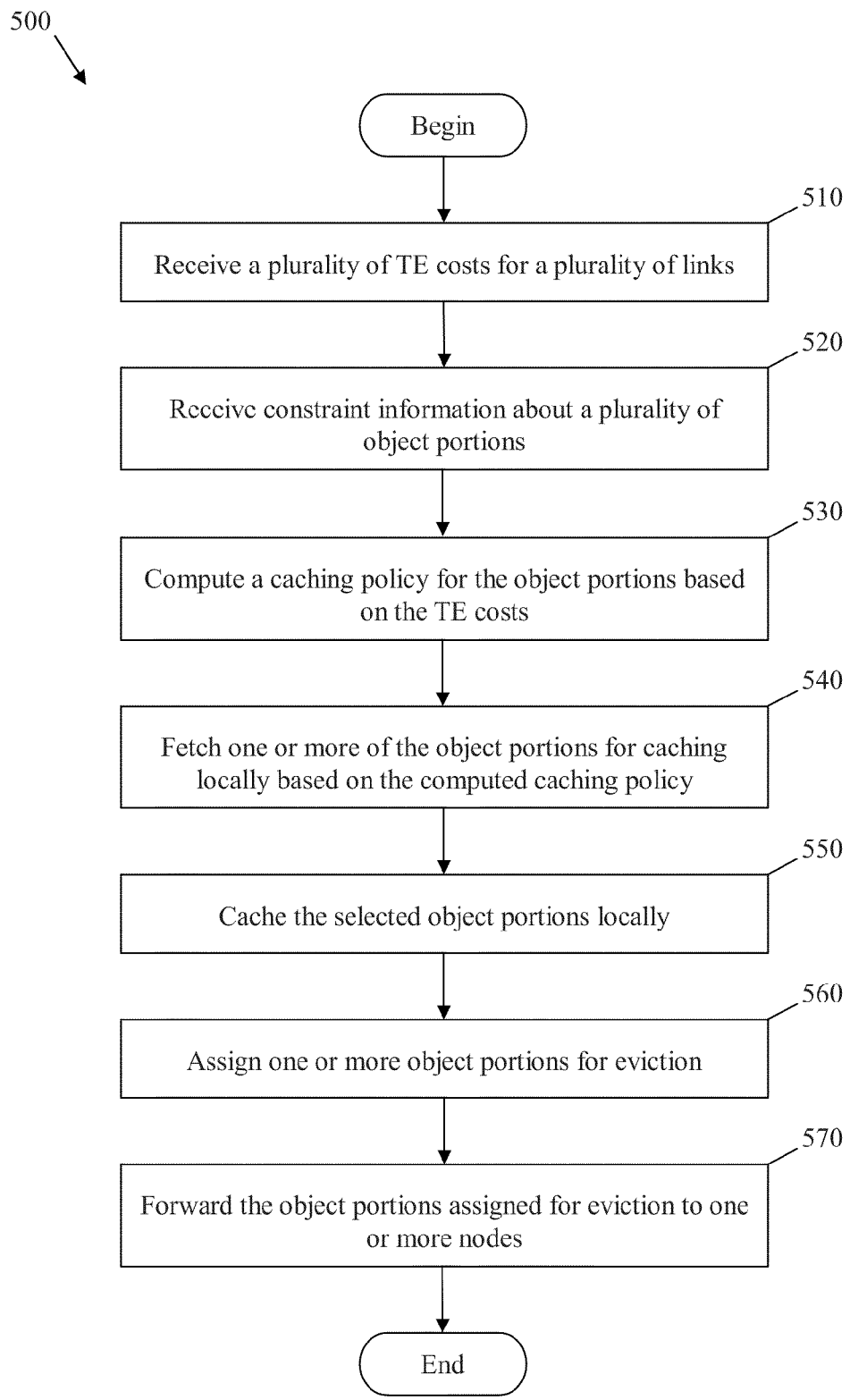
FIG. 5 is a flowchart of an embodiment of a caching method.

FIG. 5 illustrates an embodiment of a caching method 500, which may be implemented in a CONA node. For instance, the caching method 500 may be implemented by the caching engine 400 as part of a distributed CC algorithm to solve the CC sub-problem. The CC sub-problem solution may be a part of the solution of one of the TECC problems described above that uses a distributed algorithm. At block 510, a plurality of TE costs for a plurality of links may be received. For instance, the network policy component 412 may receive the TE link costs that may be aggregated for the combined links or may compute an aggregated link cost in accordance with the individual received values. The TE costs may be calculated by a TE engine for a distributed manner by a plurality of nodes associated with the links and then forwarded to a CONA node that comprise a caching engine 400 or a network policy component 412.

At block 520, information about a plurality of object portions may be received. For instance, the global caching policy component 414 may receive constraint information about one or more object portions (e.g. for different content objects) for one or more CONA nodes. At block 530, a caching policy for the object portions may be computed in accordance with the TE costs. For instance, the global caching policy component 414 may implement a distributed (CC) algorithm using the TE link costs to compute a suitable content placement/distribution strategy among one or more CONA nodes. At block 540, one or more of the object portions may be fetched for caching locally in accordance with the computed caching policy. For instance, the local caching policy component 416 may select the object portions to cache in accordance with the global caching policy computed by the global caching policy component 414, and hence the inter-cache data transfer component 430 may fetch the selected object portions from their corresponding nodes.

At block 550, the selected object portions may be cached locally. For instance, the storage engine 450 may store the object portions received by the inter-cache data transfer component 430. In some embodiments, the caching method 500 may also comprise blocks 560 and 570. A block 560, one or more cached object portions may be assigned for eviction. For instance, the eviction algorithm component 420 may select which of the object portions stored in the storage medium may be removed in accordance with received updates from other nodes, user request, and/or other changing network conditions (e.g. change in bandwidth or traffic congestion). At block 570, the object portions assigned for eviction may be forwarded to one or more nodes. For instance, the storage engine 450 may send the object portions indicated by the eviction algorithm component 420 to one or more CONA nodes. The caching method 500 may then end.

The TECC problem solutions may be simulated in accordance with a selected network topology using a simulation software or program. For example, a network topology file may be used as input to the simulation. The network topology may be used to determine the caching nodes. In the simulation, a plurality of source nodes for content objects may be generated and coupled to a plurality of caching nodes, e.g. CONA nodes by a plurality of source links. The source nodes, caching nodes, and links information may be appended to the network topology file. Hence, the topology file may be parsed and used to initialize the network model or structure, where the node link entities may be created. A Least Recently Used (LRU) routine may be used to calculate a solution for a LRU scheme. The solution may be an output of the simulation. A generalized linear programming (GLP) routine may also be used to calculate a solution for a linear programming (LP) optimization scheme, which may correspond to some of the TECC problems above. The obtained solution may be added to a database for front-end display.

Such simulation design may be a static network simulation, where the scheme is applied to a network once without significant time varying dynamics. Each time the simulation is implemented, a snapshot (e.g. still view) of the network may be obtained. This scheme may lack the simulation of traffic-related performance metrics, such as throughput. As such, the simulation may compute the worst case scenario instead of different scenarios. In the worst case scenario, multiple or all the users may request all the content at about the same time and thus trigger multiple or all the flows simultaneously.

To simulate a time-varying network behavior, user demand may be generated dynamically following certain distributions. Accordingly, the user may request one content or object at a specific time, create multiple sessions, receive the content from the caching nodes or the source nodes, and terminate the sessions upon receiving a full or complete copy of the requested content. To achieve such network dynamics, additional features may be added to the simulation. The features may comprise a Class Session, which may be derived from a Flow Class included in the simulation and may be used to distinguish between multiple paths. The features may comprise a Class Node, which may include a LinkedList Session, a Function addSession( ) a Function removeSession( ) and a Function updateSession( ) that traverses a session linked list, decrement the remaining work of each session according to flow rates, and send an event if a session is finished. The Class Node may also include a Function initSession( ) that randomly generates content request following a user demand distribution.

The features may also comprise a Class Network, which may include a Queue event, a Function updateEvent( ) a Function eventDispatcher( ) and a Function eventHandler( ) that may be called by the Function eventDispatcher( ). The Class Network may comprise more than one handler for different purposes. The Class Network may also include a Modify Function calcLinkUtilization( ) for throughput calculation purpose. The features may also comprise a Class Event, which may include a double timeStamp variable and an integer evenType variable.

Figure 6:
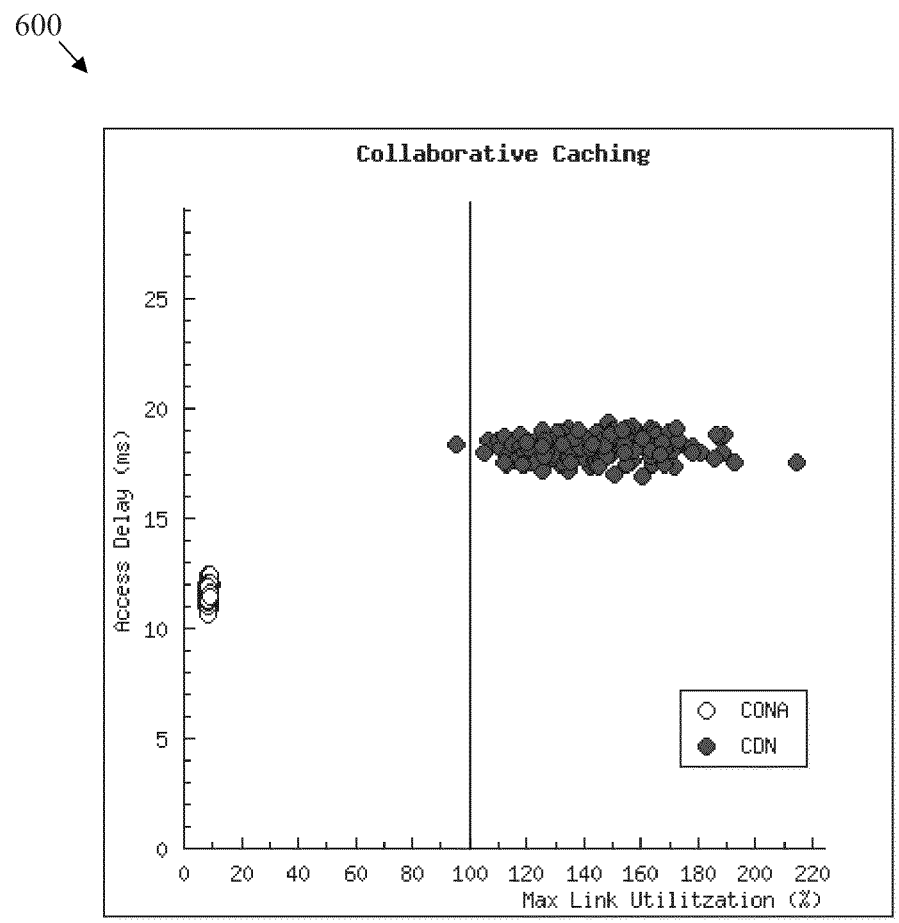
FIG. 6 is a chart of an embodiment of collaborative caching simulation results.

FIG. 6 illustrates an example of a chart for CC simulation results 600 that are obtained by solving the TECC problem and using simulation as described above. The CC simulation results 600 may represent the end-user perceived performance in accordance with two algorithms, the CONA or TECC algorithm and a content delivery network (CDN) algorithm that is currently used for some networks. Each data point in the chart represents the result obtained from a single implementation or run of the simulation. The points indicate the access delay in milliseconds (ms) vs. the percentage of maximum link utilization. In the simulations, a relatively large content was considered for distribution, e.g. to clearly differentiate the performances of the CONA and CDN algorithms. The CONA or TECC algorithm used may be implemented for both CONA based networks and similarly for IP based networks, such as the Internet. As shown in FIG. 6, the access delay for receiving content by end users using the CONA algorithm is about 30 percent lower than the delay obtained using the CDN algorithm. The maximum link utilization achieved using the CONA algorithm is also substantially smaller than the maximum link utilization achieved using the CDN algorithm for all the points considered.

Figure 7:
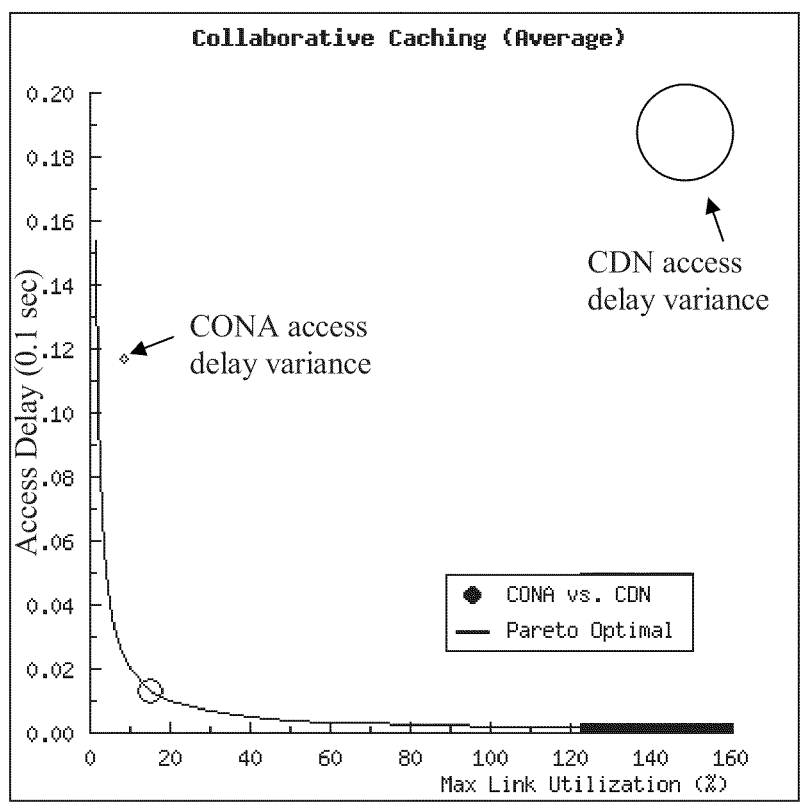
FIG. 7 is a chart of another embodiment of collaborative caching simulation results.

FIG. 7 illustrates an example of a chart for average CC simulation results 700 that correspond to the CC simulation results 600. The diameter of the circle at the top right corner represents the variance in access delays obtained by the CDN algorithm. The diameter of the much smaller circle represents the access delay variance obtained using the CONA algorithm, which may be substantially smaller than the access delay variance of the CDN algorithm. The variance of the access delay may indicate the stability of the performance of the corresponding algorithm, where a smaller variance indicates a more stable performance. The curve in the chart represents the feasibility region, e.g. the feasible solutions that may be achieved.

Figure 8:
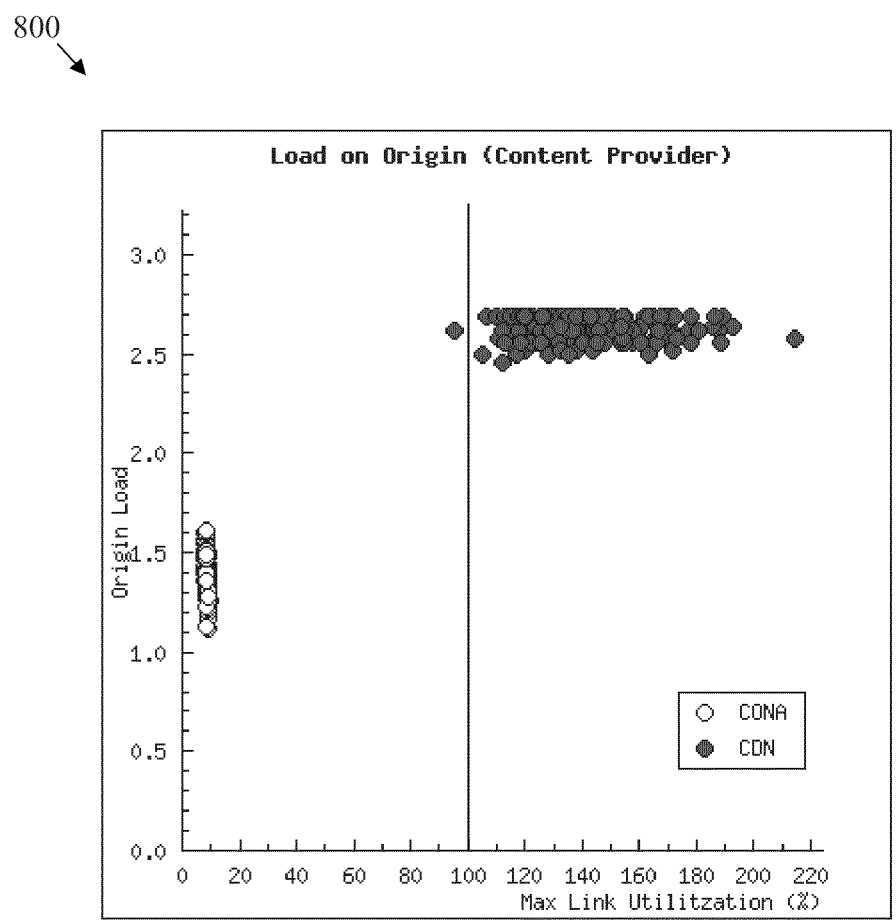
FIG. 8 is a chart of another embodiment of collaborative caching simulation results.

FIG. 8 illustrates an example of a chart for CC simulation results 800 that correspond to the CC simulation results 600. Each data point in the chart corresponds to one of the points in the CC simulation results 600 and represents the result obtained from a single implementation of the simulation, as observed from a network carrier perspective. Thus, the CC simulation results 800 may represent the end-user perceived performance. The points indicate the origin traffic load vs. the percentage of maximum link utilization, as obtained using the CONA and CDN algorithms. The traffic load on the origin, e.g. incurred on the content providers' premises (e.g., server farms, upstream links, etc.) may be a decisive factor of network performance, as the traffic may be directly translated into the number of servers that may be maintained by the content providers and the associated costs (including both server costs and bandwidth costs). Thus, the lower traffic load on the origins (e.g. content providers' premises), the better network performance can be achieved. As shown in FIG. 8, the CONA algorithm may reduce the origin load by about 50 percent in comparison to the CDN algorithm.

Figure 9:
FIG. 9 is a map of an embodiment of network utilization simulation results.
Figure 10:
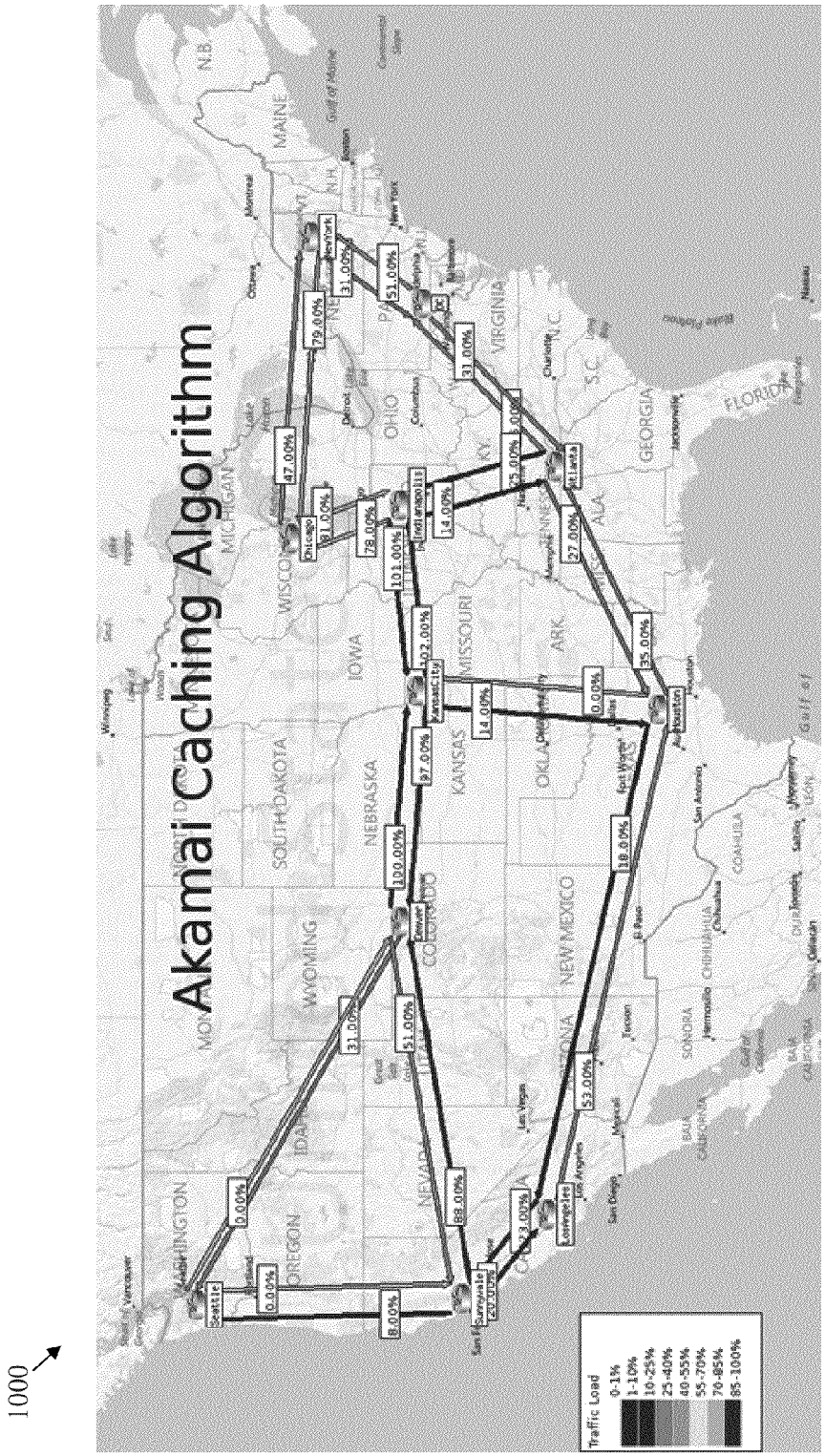
FIG. 10 is a map of another embodiment of network utilization simulation results.

FIGS. 9 and 10 illustrate maps for network utilization simulation results 900 in accordance with the CONA algorithm and network utilization simulation results 1000 in accordance with the CDN algorithm, respectively. The network utilization simulation results 900 and the network utilization simulation results 1000 are obtained using simulations on typical network carrier's topology (e.g. Abilene network). In both cases, the same sets of content are distributed over the network topology to the same set of users. It is clear by comparing the two simulation results that the content load distribution is far better balanced over the set of users in the case of the CONA algorithm. FIG. 9 shows that about one to about 10 percent of load may be distributed using the CONA (or TECC) algorithm over each link between the nodes or users over the network. In contrast, FIG. 10 shows that substantially different traffic loads or percentages may be distributed using the CDN algorithm over each link between the nodes over the network, with distribution being widely variable, ranging from 0%-102%.

Figure 11:
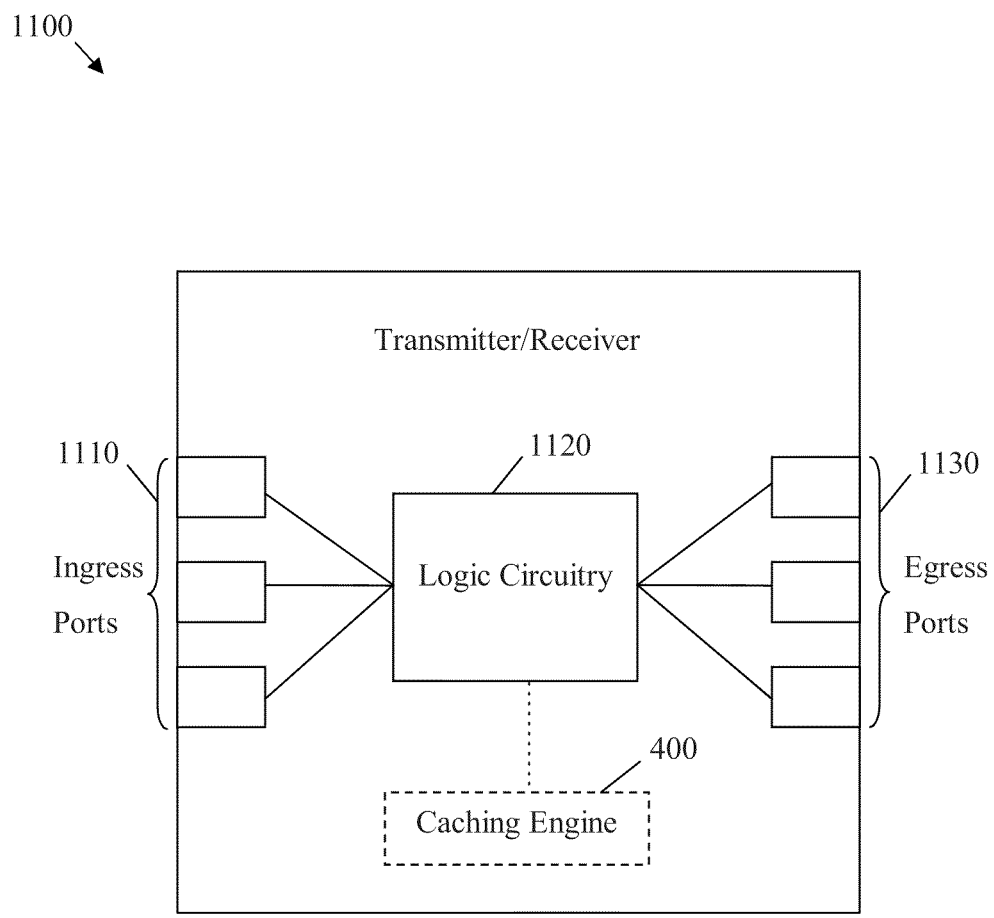
FIG. 11 is a schematic diagram of an embodiment of a transmitter/receiver unit.

FIG. 11 illustrates an embodiment of a transmitter/receiver unit 1100, which may be any device that transports packets through a network. For instance, the transmitter/receiver unit 1100 may be located in the any of the nodes in the network architecture 100 or 300, such as any of the CONA nodes, and may comprise the caching engine 400. The transmitted/receiver unit 1100 may comprise one or more ingress ports or units 1110 for receiving packets, objects, or type-length-values (TLVs) from other network components, logic circuitry 1120 to determine which network components to send the packets to, and one or more egress ports or units 1130 for transmitting frames to the other network components. The logic circuitry 1120 may comprise components of the caching engine 400 and the transmitter/receiver unit 1100 may implement the caching method 500.

Figure 12:
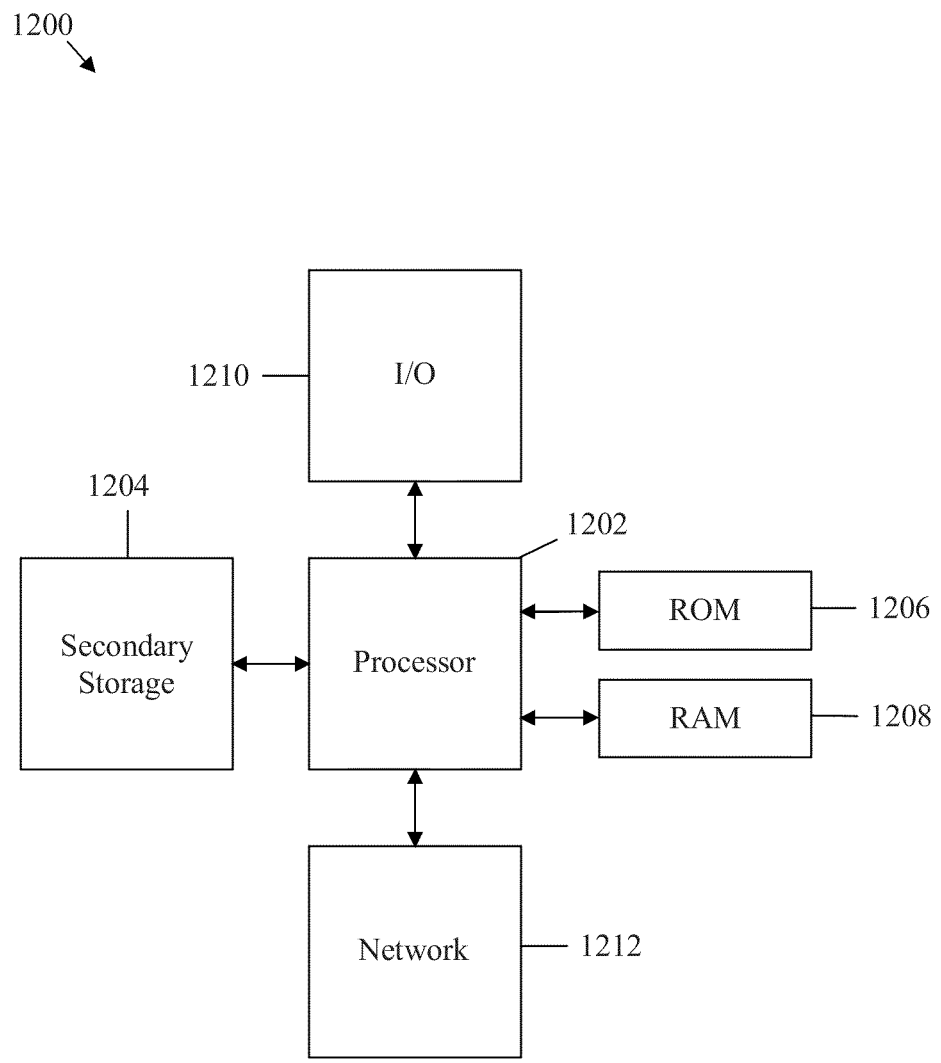
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs) and/or digital signal processors (DSPs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204, as when they utilize different technologies but such is not required.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of broader terms such as "comprises", "includes", and "having" should be understood to provide support for narrower terms such as "consisting of", "consisting essentially of", and "comprised substantially of". Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a caching policy engine configured to receive network policy information associated with content object portions to be transferred between a source node and a destination node and compute a caching policy based on the network policy information, wherein the caching policy engine comprises a global caching policy component configured to:
      communicate with a remote global caching policy component in a remote network component to receive partial content caching information comprising constraints describing the content object portions to be transferred between the source node and the destination node and describing a probability that the content object portions to be transferred can be received by the destination node, wherein the network component is not the destination node; and
      compute the caching policy based on the network policy information and the partial content caching information;
   an inter-cache data transfer component coupled to the caching policy engine and configured to fetch at least one of the content object portions in accordance with the caching policy;
   a storage engine coupled to the inter-cache data transfer component and configured to cache at least one of the content object portions; and
   an eviction algorithm component coupled to the storage engine and configured to select cached content object portions for eviction from the storage engine.

2. The network component of claim 1, wherein the caching policy engine further comprises:
   a network policy component coupled to the global caching policy component and configured to receive the network policy information; and
   a local caching policy component coupled to the global caching policy component and configured to determine which of the plurality of content object portions to cache in the storage engine in accordance with the caching policy.

3. The network component of claim 2, wherein the network policy information comprises traffic engineering (TE) feedback information in accordance with a plurality of TE link costs, and wherein the caching policy comprises an optimized content replica placement strategy.

4. The network component of claim 3, wherein the caching policy engine implements a distributed collaborative caching (CC) algorithm in collaboration with a plurality of caching policy engines at a plurality of nodes to solve a CC sub-problem, and wherein the CC sub-problem is part of a combined TE and CC (TECC) problem.

5. The network component of claim 4, wherein the TECC problem is decomposed into a TE sub-problem and the CC sub-problem, wherein the TE link costs are calculated for each of a plurality of links by solving the TE sub-problem by one or more TE engines in a distributed manner, and wherein the TE link costs are combined to obtain a total cost for the aggregated links.

6. The network component of claim 4, wherein at least one node may be introduced in accordance with demand from at least one content originating server.

7. The network component of claim 4, wherein each node caches some, but not all, of the content object portions.

8. The network component of claim 1 further comprising: a statistics collection component coupled to the caching policy engine, the eviction algorithm component, and the storage engine and configured to collect statistics information from the caching policy engine, the eviction algorithm component, and the storage engine and transmit the statistics information.

9. The network component of claim 1, wherein the caching policy engine is further configured to implement a distributed collaborative caching (CC) algorithm in collaboration with a plurality of caching policy engines at a plurality of nodes to solve a CC sub-problem, wherein the CC sub-problem is part of a combined TE and CC (TECC) problem, and wherein the TECC problem is formulated and solved using linear programming as follows:

$$\min \max_{e \in E} \left( b_e + \sum_{i \neq j} t_{ij} I_e(i, j) \right) / c_e \quad (14)$$

$$s.t. \ \forall i, j \in I \text{ and } i \neq j, t_{ij} = \sum_{k \in K} x_{ij}^k s_k q_j^k \quad (15)$$

$$\forall k \in K, i \in I, \sum_{j \in I, j \neq i} x_{ji}^k + x_{ii}^k \geq 1 \quad (16)$$

$$\forall i \in I, \sum_{k \in K} x_{ii}^k s_k \leq v_i \quad (17)$$

$$\sum_{k \in K} s_k \leq \sum_{i \in I} v_i \quad (18)$$

$$\forall i, j \in I \text{ and } i \neq j, k \in K, x_{ij}^k \leq x_{ii}^k \quad (19)$$

$$\forall i \in I, k \in K, x_{ii}^k s_k \geq \overline{s_k} \quad (20)$$

$$\forall i, j \in I, k \in K, 0 \leq x_{ij}^k \leq 1 \quad (21)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $x_{ij}^k$ represents a partially cached portion of object k that is transferred from node i to node j, $x_{ii}^k$ represents a locally cached portion of object k at node i, $q_j^k$ is a probability of receiving requested object k by node j, I is a set of content oriented network architecture (CONA) nodes, K is a set of content objects, $s_k$ is a size of object k, $\overline{s_k}$ is a portion size, and $v_i$ is a storage capacity of node i.

10. The network component of claim 1, wherein the caching policy engine is further configured to implement a distributed collaborative caching (CC) algorithm in collaboration with a plurality of caching policy engines at a plurality of nodes to solve a CC sub-problem, wherein the CC sub-problem is part of a combined TE and CC (TECC) problem, and wherein the TECC problem is formulated and solved using linear programming as follows:

$$\min \max_{e \in E} \left( b_e + \sum_{i \neq j} t_{ij} I_e(i, j) \right) / c_e \quad (22)$$

$$s.t. \ \forall i, j \in I \text{ and } i \neq j, t_{ij} = \sum_{k \in K} x_i^k s_k q_j^k \quad (23)$$

$$\forall k \in K, \sum_{i \in I} x_i^k \geq 1 \quad (24)$$

$$\forall i \in I, \sum_{k \in K} x_i^k s_k \leq v_i \quad (25)$$

$$\sum_{k \in K} s_k \leq \sum_{i \in I} v_i \quad (26)$$

$$\forall i \in I, k \in K, x_i^k s_k \geq \overline{s_k} \quad (27)$$

$$\forall i, j \in I, k \in K, 0 \leq x_i^k \leq 1 \quad (28)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $x_i^k$ represents a partially cached portion of object k at node i, $q_j^k$ is a probability of receiving requested object k by node j, I is a set of content oriented network architecture (CONA) nodes, K is a set of content objects, $s_k$ is a size of object k, $\overline{s_k}$ is a portion size, and $v_i$ is a storage capacity of node i.

11. The network component of claim 1, wherein the caching policy engine is further configured to implement a distributed collaborative caching (CC) algorithm in collaboration with a plurality of caching policy engines at a plurality of nodes to solve a CC sub-problem, wherein the CC sub-problem is part of a combined TE and CC (TECC) problem, and wherein the TECC problem is formulated and solved using linear programming as follows:

$$\min \max_{e \in E} \left( b_e + \sum_{i \neq j} t_{ij} I_e(i, j) \right) / c_e \quad (29)$$

$$s.t. \ \forall i, j \in I \text{ and } i \neq j, t_{ij} = \sum_{k \in K} x_i^k s_k q_j^k \quad (30)$$

$$\forall k \in K, i \in I \sum_{j \in I} x_{ji}^k + y_i^k \geq 1 \quad (31)$$

$$\forall i \in I, \sum_{k \in K} y_i^k s_k \leq v_i \quad (32)$$

$$\forall i, j \in I, k \in K, 0 \leq x_i^k \leq y_i^k \leq 1 \quad (33)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $x_{ij}^k$ represents a portion of an object k that is sent from node i to node j, $y_i^k$ represents a portion of an object k that is cached by node i, $q_j^k$ is a probability of receiving requested object k by node j, I is a set of content oriented network architecture (CONA) nodes, K is a set of content objects, $s_k$ is a size of object k, and $v_i$ is a storage capacity of node i.

12. The network component of claim 1, wherein the caching policy engine is further configured to implement a distributed collaborative caching (CC) algorithm in collaboration with a plurality of caching policy engines at a plurality of nodes to solve a CC sub-problem, wherein the CC sub-problem is part of a combined TE and CC (TECC) problem, and wherein the TECC problem is formulated and solved using quadratic programming as follows:

$$\min_{e \in E} \max \left( b_e + \sum_{i \neq j} t_{ij} I_e(i, j) \right) / c_e \qquad (1)$$

$$\text{s.t. } \forall\, i, j \in I, t_{ij} = \sum_{k \in K} y_i^k (1 - y_j^k) s_k q_j^k \qquad (2)$$

$$\forall\, k \in K, \sum_{i \in I} y_i^k \geq 1 \qquad (3)$$

$$\forall\, i \in I, \sum_{k \in K} y_i^k s_k \leq v_i \qquad (4)$$

$$\sum_{k \in K} s_k \leq \sum_{i \in I} v_i \qquad (5)$$

$$y_i^k \in \{0, 1\} \qquad (6)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $y_i^k$ is set if node i has object k in a local cache, $q_j^k$ is a probability of receiving requested object k by node j, I is a set of content oriented network architecture (CONA) nodes, K is a set of content objects, $s_k$ is a size of object k, and $v_i$ is a storage capacity of node i.

13. The network component of claim 1, wherein the caching policy engine is further configured to implement a distributed collaborative caching (CC) algorithm in collaboration with a plurality of caching policy engines at a plurality of nodes to solve a CC sub-problem, wherein the CC sub-problem is part of a combined TE and CC (TECC) problem, and wherein the TECC problem is formulated and solved using integral programming as follows:

$$\min_{e \in E} \max \left( b_e + \sum_{i \neq j} t_{ij} I_e(i, j) \right) / c_e \qquad (7)$$

$$\text{s.t. } \forall\, i, j \in I, t_{ij} = \sum_{k \in K} x_{ij}^k s_k q_j^k \qquad (8)$$

$$\forall\, k \in K, j \in I, \sum_{i \in I, i \neq j} x_{ij}^k + y_j^k = 1 \qquad (9)$$

$$\forall\, i \in I, \sum_{k \in K} y_i^k s_k \leq v_i \qquad (10)$$

$$\sum_{k \in K} s_k \leq \sum_{i \in I} v_i \qquad (11)$$

$$\forall\, i, j \in I, x_{ij}^k < y_i^k \qquad (12)$$

$$\forall\, i, j \in I, x_{ij}^k, y_i^k \in \{0, 1\} \qquad (13)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $x_{ij}^k$ represents an inter-cache data transfer and is set if node i transfers object k to node j, $y_i^k$ is set if node i has object k in a local cache, $q_j^k$ is a probability of receiving requested object k by node j, I is a set of content oriented network architecture (CONA) nodes, K is a set of content objects, $s_k$ is a size of object k, and $v_i$ is a storage capacity of node i.

14. A network component comprising:
a caching policy engine configured to receive network policy information and compute a caching policy in accordance with the network policy information, wherein the caching policy engine comprises:
a network policy component configured to receive the network policy information;
a global caching policy component coupled to the network policy component and configured to exchange partial content caching information and compute the caching policy in accordance with the network policy information and the partial content caching information; and
a local caching policy component coupled to the global caching policy component and configured to determine caching a plurality of content object portions in accordance with the caching policy,
an inter-cache data transfer component coupled to the caching policy engine and configured to fetch a plurality of content object portions in accordance with the caching policy;
a storage engine coupled to the inter-cache data transfer component and configured to cache the content object portions; and
an eviction algorithm component coupled to the storage engine and configured to determine which, if any, of the cached content object portions are to be evicted,
wherein the network policy information comprises traffic engineering (TE) feedback information in accordance with a plurality of TE link costs,
wherein the partial content caching information comprises a plurality of parameters regarding transferred content object portions between a plurality of nodes,
wherein the caching policy comprises an optimal content replica placement strategy,
wherein the caching policy engine implements a distributed collaborative caching (CC) algorithm in collaboration with a plurality of caching policy engines at a plurality of nodes to solve a CC sub-problem,
wherein the CC sub-problem is part of a combined TE and CC (TECC) problem, and
wherein the TECC problem is formulated and solved using quadratic programming as follows:

$$\min_{e \in E} \max \left( b_e + \sum_{i \neq j} t_{ij} I_e(i, j) \right) / c_e \qquad (1)$$

$$\text{s.t. } \forall\, i, j \in I, t_{ij} = \sum_{k \in K} y_i^k (1 - y_j^k) s_k q_j^k \qquad (2)$$

$$\forall\, k \in K, \sum_{i \in I} y_i^k \geq 1 \qquad (3)$$

$$\forall\, i \in I, \sum_{k \in K} y_i^k s_k \leq v_i \qquad (4)$$

$$\sum_{k \in K} s_k \leq \sum_{i \in I} v_i \qquad (5)$$

$$y_i^k \in \{0, 1\} \qquad (6)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $y_i^k$ is set if node i has object k in a local cache, $q_j^k$ is a probability of receiving requested object k by node j, I is a set of content oriented network architecture (CONA) nodes, K is a set of content objects, $s_k$ is a size of object k, and $v_i$ is a storage capacity of node i.

15. A network component comprising:
a caching policy engine configured to receive network policy information and compute a caching policy in accordance with the network policy information, wherein the caching policy engine comprises:
  a network policy component configured to receive the network policy information;
  a global caching policy component coupled to the network policy component and configured to exchange partial content caching information and compute the caching policy in accordance with the network policy information and the partial content caching information; and
  a local caching policy component coupled to the global caching policy component and configured to determine caching a plurality of content object portions in accordance with the caching policy,
an inter-cache data transfer component coupled to the caching policy engine and configured to fetch a plurality of content object portions in accordance with the caching policy;
a storage engine coupled to the inter-cache data transfer component and configured to cache the content object portions; and
an eviction algorithm component coupled to the storage engine and configured to determine which, if any, of the cached content object portions are to be evicted,
wherein the network policy information comprises traffic engineering (TE) feedback information in accordance with a plurality of TE link costs,
wherein the partial content caching information comprises a plurality of parameters regarding transferred content object portions between a plurality of nodes,
wherein the caching policy comprises an optimal content replica placement strategy,
wherein the caching policy engine implements a distributed collaborative caching (CC) algorithm in collaboration with a plurality of caching policy engines at a plurality of nodes to solve a CC sub-problem,
wherein the CC sub-problem is part of a combined TE and CC (TECC) problem, and
wherein the TECC problem is formulated and solved using integral programming as follows:

$$\min_{e \in E} \max \left( b_e + \sum_{i \neq j} t_{ij} I_e(i,j) \right) / c_e \quad (7)$$

$$s.t. \ \forall i, j \in I, t_{ij} = \sum_{k \in K} x_{ij}^k s_k q_j^k \quad (8)$$

$$\forall k \in K, j \in I, \sum_{i \in I, i \neq j} x_{ij}^k + y_j^k = 1 \quad (9)$$

$$\forall i \in I, \sum_{k \in K} y_i^k s_k \leq v_i \quad (10)$$

$$\sum_{k \in K} s_k \leq \sum_{i \in I} v_i \quad (11)$$

$$\forall i, j \in I, x_{ij}^k < y_i^k \quad (12)$$

$$\forall i, j \in I, x_{ij}^k, y_i^k \in \{0, 1\} \quad (13)$$

where $t_{ij}$ is inter-cache traffic transferred from node i to node j, $I_e(i,j)$ is a routing matrix that is set if link e is on the directed path from node i to node j, $c_e$ is a physical capacity of link e, $b_e$ is a background traffic on link e, $x_{ij}^k$ represents an inter-cache data transfer and is set if node i transfers object k to node j, $y_i^k$ is set if node i has object k in a local cache, $q_j^k$ is a probability of receiving requested object k by node j, I is a set of content oriented network architecture (CONA) nodes, K is a set of content objects, $s_k$ is a size of object k, and $v_i$ is a storage capacity of node i.

* * * * *